（12）United States Patent
Kersjes et al.

(10) Patent No.: US 9,888,516 B1
(45) Date of Patent: Feb. 6, 2018

(54) REDUNDANT CONTACTLESS COMMUNICATION

(71) Applicant: Keyssa Systems, Inc., Campbell, CA (US)

(72) Inventors: Theo Kersjes, Newberg, OR (US); Tyler G. Bowman, Sherwood, OR (US); Nicholas Antonopoulos, San Jose, CA (US)

(73) Assignee: Keyssa Systems, Inc., Campbell, CA (US)

( * ) Notice: Subject to any disclaimer, the term of this patent is extended or adjusted under 35 U.S.C. 154(b) by 0 days.

(21) Appl. No.: 15/203,682

(22) Filed: Jul. 6, 2016

(51) Int. Cl.
  *H04B 5/00* (2006.01)
  *H04W 76/02* (2009.01)
  *H04W 4/00* (2009.01)

(52) U.S. Cl.
  CPC ........ *H04W 76/025* (2013.01); *H04B 5/0031* (2013.01); *H04W 4/008* (2013.01)

(58) Field of Classification Search
  CPC ....... H01L 2924/00; H01L 2924/00012; H01L 2924/00014; H01L 2924/181; H01L 2224/48091; H01L 2224/73265; H01L 2924/3011; H01L 2924/3025; H01L 2224/48227; H01L 2924/15311; H01L 2224/32225; H01L 2223/6677; H04B 5/0031; H04B 5/0037; H04B 5/02; H04B 5/0075; H04B 15/00; H04B 1/123; H04B 1/40; H04B 1/401; H04B 5/0012; H04B 5/0081; H04B 5/0093; H04B 7/0613; H04B 7/0817; H04B 7/10; H01F 38/14; H01F 3/10; H01F 17/045; H01F 27/24; H01F 27/38; H01F 38/18; H01F 41/005
  See application file for complete search history.

(56) References Cited

U.S. PATENT DOCUMENTS

| | | | |
|---|---|---|---|
| 2012/0290760 A1* | 11/2012 | McCormack ........ | H04B 5/0037 710/303 |
| 2013/0084801 A1* | 4/2013 | Royston ................. | G06K 7/015 455/41.1 |
| 2014/0043745 A1* | 2/2014 | McCormack ........... | G06F 13/00 361/679.09 |
| 2014/0106680 A1* | 4/2014 | McCormack ......... | H04W 12/06 455/63.1 |
| 2014/0273856 A1* | 9/2014 | Kyles ..................... | H04B 1/401 455/41.2 |
| 2016/0181857 A1* | 6/2016 | Konanur ................. | H01Q 7/00 320/108 |

* cited by examiner

*Primary Examiner* — Golam Sorowar (74) *Attorney, Agent, or Firm* — Fish & Richardson P.C.

(57) ABSTRACT

Methods, systems, and apparatus for EM communications. One of the apparatus includes a first device comprising: a first contactless connector and a second contactless connector, and a first controller configured to test the first contactless connector and the second contactless connector to determine a primary connector and a redundant connector, wherein the primary connector is configured to establish a communication link with a connector of another device.

10 Claims, 7 Drawing Sheets

REDUNDANT CONTACTLESS COMMUNICATION

BACKGROUND

This specification relates to electromagnetic communications.

Advances in semiconductor manufacturing and circuit design technologies have enabled the development and production of integrated circuits (ICs) with increasingly higher operational frequencies. In turn, electronic products and systems incorporating high frequency integrated circuits are able to provide greater functionality than previous generations of products. The additional functionality has typically included the processing of increasingly larger amounts of data at increasingly higher speeds.

Contactless connectors can be used to transfer data between devices. In contrast to conventional cabled connectors, contactless connectors can be used to provide point-to-point data communication between two devices without requiring a mechanical coupling to enable data transfer.

SUMMARY

In general, one innovative aspect of the subject matter described in this specification can be embodied in systems that include a first device comprising: a first contactless connector and a second contactless connector, and a first controller configured to test the first contactless connector and the second contactless connector to determine a primary connector and a redundant connector; and a second device comprising: a third contactless connector and a fourth contactless connector, and a second controller configured to test the third contactless connector and the fourth contactless connector to determine a primary connector and a redundant connector, wherein each of the first contactless connector and the second contactless connector is configured to selectably establish a communication link with either the third contactless connector or the fourth contactless connector. Other aspects of this embodiment include corresponding methods and apparatus.

The foregoing and other embodiments can each optionally include one or more of the following features, alone or in combination. In particular, one embodiment includes all the following features in combination. The first and second contactless connectors of the first device each include a transceiver having an antenna oriented such that the first and second contactless connector are communicatively coupled to each other.

The third and fourth contactless connectors of the second device each include a transceiver having an antenna oriented such that the third and fourth contactless connector are communicatively coupled to each other. The first device is positioned in proximity to the second device such that the first contactless connector is aligned with the third contactless connector, a communication link is selectively formed between any one of the first and second contactless connector and any one of the third and fourth contactless connector. The first device further comprises one or more additional contactless connectors configured as a redundant connectors. The second device further comprises one or more additional contactless connectors configured as a redundant connectors. The first controller includes a state machine configured to test the operation of the first contactless connector and the second contactless connector, wherein a primary connector and a redundant connector is established based on the testing.

In general, one innovative aspect of the subject matter described in this specification can be embodied in methods that include the actions of performing a loopback test on a first contactless connector and a second contactless connector of a first device, wherein performing the loopback test comprises: configuring the first contactless connector as a transmitter and the second contactless connector as a receiver, sending a signal pattern from the first contactless connector to the second contactless connector, determining whether the received pattern matches the sent signal pattern, in response to determining that the received pattern matches, configuring the first contactless connector as a receiver and the second contactless connector as a transmitter, sending a signal pattern from the second contactless connector to the first contactless connector, determining whether the received pattern matches the sent signal pattern, in response to determining that the received pattern matches, setting the first contactless connector as a primary connector and the second contactless connector as a redundant connector; and establishing a communication link between the first device and a second device using the primary connector. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Establishing the communication link between the first device and the second device includes configuring half-duplex communication. The half duplex communication includes switching the transceiver of the primary connector between transmitter and receiver modes. In response to determining that the received pattern does not match, determining a loopback error response. The loopback error response establishes a primary connector for communication with the second device by alternating transmission by the first contactless connector and the second contactless connector and establishing the primary connector based on confirmation messages received from the second device. The method further includes determining an error condition in the first contactless connector; and responsive to the error, activating the second contactless connector and using the second contactless connector to provide the communication link between the first device and the second device.

In general, one innovative aspect of the subject matter described in this specification can be embodied in systems that include a first device comprising: a first pair of connectors including a first contactless connector and a second contactless connector, a second pair of connectors including a third contactless connector and a fourth contactless connector, and a first controller configured to test the first pair of contactless connectors and the second pair of contactless connectors to determine a respective primary connector an redundant connector for each pair; and a second device comprising: a third pair of connectors including a fifth contactless connector and a sixth contactless connector, a fourth pair of connectors including a seventh contactless connector and an eighth contactless connector, and a first controller configured to test the first pair of contactless connectors and the second pair of contactless connectors to determine a respective primary connector an redundant connector for each pair wherein each of the first pair of connectors is configured to selectably establish a communication link with a respective connector of the third pair of connectors and each of the second pair of connectors is configured to selectably establish a communication link with a respective connector of the fourth pair of connectors.

In general, one innovative aspect of the subject matter described in this specification can be embodied in methods that include the actions of performing a loopback test on a first pair of contactless connectors and a second pair of contactless connectors, wherein performing the loopback test for each pair of contactless connectors comprises: configuring a first contactless connector of the pair as a transmitter and a second contactless connector of the pair as a receiver, sending a signal pattern from the first contactless connector to the second contactless connector, determining whether the received pattern matches the sent signal pattern, in response to determining that the received pattern matches, configuring the first contactless connector as a receiver and the second contactless connector as a transmitter, sending a signal pattern from the second contactless connector to the first contactless connector, determining whether the received pattern matches the sent signal pattern, in response to determining that the received pattern matches, setting the first contactless connector as a primary connector for the pair and the second contactless connector as a redundant connector for the pair; and establishing respective communication links between the first device and a second device for each pair of contactless connectors using the primary connector for each pair. Other embodiments of this aspect include corresponding computer systems, apparatus, and computer programs recorded on one or more computer storage devices, each configured to perform the actions of the methods.

In general, one innovative aspect of the subject matter described in this specification can be embodied in systems that include a first device comprising: a first contactless connector and a second contactless connector, and a first controller configured to test the first contactless connector and the second contactless connector to determine a primary connector and a redundant connector, wherein the primary connector is configured to establish a communication link with a connector of another device.

The subject matter described in this specification can be implemented in particular embodiments so as to realize one or more of the following advantages. Contactless connectors can be used to provide data communication between two devices positioned within a specified proximity to each other. Since no mechanical connection is required, redundant data paths can be established by positioning multiple transceivers in one or more electromagnetic (EM) field regions, e.g., an EM field bubble. The best transmitter and receiver pairs can be selected for data communication dynamically from among the redundant transceivers. Additionally, the other transceivers can be maintained in standby mode capable of taking over communication if needed. The contactless connector redundancy can be used to provide high reliability when operating in harsh environments. Furthermore, the contactless connectors can be sealed making them suitable for exposure to harsh environments without impacting performance.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION

Overview

This specification describes contactless connectors that allow for redundant data communication EM paths between devices. The ability to provide redundant contactless communication can be important in many different settings. For example, the connectors can be located in difficult to access, environmentally harsh, or time-consuming locations where redundancy reduces the costs associated with a failed connection. In some implementations, the connectors can be used to couple an underwater device, e.g., a remotely operated vehicle, to a surface device, (e.g., through a data cable). Mechanical underwater connectors can lead to galvanic corrosion or can require elaborate sealed connector designs to prevent water exposer to the electrical connection pins. By contrast, a contactless connector can be sealed and establish a communication link by placing contactless connection areas in close proximity, they can be used to establish dynamic connections underwater.

The contactless connector can include one or more communication modules having one or more integrated circuit packages. Each integrated circuit package can have a transceiver. The contactless connector for each device can include two or more transceivers, which allow for redundant communication. This specification describes structures and processes for providing redundant data communication between devices having contactless connectors.

Contactless Communication Modules

Contactless communication may be used to provide signal communications between components on a device or may provide communication between devices. In one example, tightly-coupled transmitter/receiver pairs may be deployed with a transmitter disposed at a terminal portion of a first conduction path and a receiver disposed at a terminal portion of a second conduction path. The transmitter and receiver may be transceivers operating in respective transmitter and receiver modes. The transmitter and receiver may be disposed in close proximity to each other depending on the strength of the transmitted energy, and the first conduction path and the second conduction path may not be contiguous with respect to each other. In some examples, the transmitter and receiver may be disposed on separate circuit carriers positioned with transducers (e.g., one or more antennas) of the transmitter/receiver pair in close proximity.

A transmitter, receiver, or transceiver may be configured as an integrated circuit (IC) package, in which one or more transducers may be positioned adjacent to a die and held in place by a dielectric or insulating encapsulation or bond material. A transducer may also be held in place by a lead frame substrate. Note that IC packages are examples of contactless communication units that are also variously referred to as communication units, communication devices, comm-link chips, comm-link chip assemblies, comm-link chip packages, and/or comm-link packages, which may be configured in various ways. For example, IC packages, communication units, communication devices, comm-link chips, comm-link chip assemblies, comm-link chip packages, and/or comm-link packages may each include one or more ICs, chips, or dies and have circuit functionality appropriate for particular applications.

Figure 1:
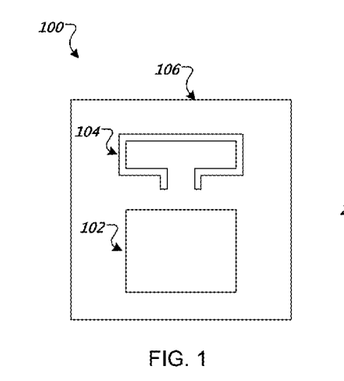
FIG. 1 is an overhead view of an example IC package.

FIG. 1 shows an example IC package 100. The IC package 100 includes a die 102 and a transducer 104 providing conversion between electrical and EM signals. The IC package 100 may include additional structures, for example, conductive connectors, such as bond wires, electrically connecting the transducer to bond pads connected to a transmitter and/or receiver circuit included in die 102. The IC package 100 further includes an encapsulating material 106 formed around at least a portion of the die 102 and/or the transducer 104. In the example IC package 100, the encapsulating material 104 completely covers the die 100 and the transducer 104.

The die 102 includes any suitable structure configured as a circuit on a suitable die substrate. In some implementations, the die can alternatively be referred to as a chip or an integrated circuit. The die substrate may be composed of any suitable semiconductor material, for example, silicon. The die 102 may be mounted with electrical conductors, such as a lead frame, not shown in FIG. 1, electrically coupling the die 102 to one or more external circuits. The IC package 100 can further include a transformer to provide impedance matching between a circuit on the die 102 and the transducer 104.

The transducer 104 may be in the form of a folded dipole or loop antenna and is configured to transmit and/or receive electromagnetic signals. In some implementations, the transducer 104 is configured to operate at radio frequencies including radio frequencies in the extremely high frequency (EHF) band of the electromagnetic spectrum, e.g., frequencies from 30 to 300 gigahertz. As shown in IC package 100, the transducer 104 is separate from the die 102, but is coupled to the die 102 by suitable conductors, not shown. The dimensions of the transducer are determined such that they are suitable for operation in the specified frequency band of the electromagnetic spectrum, e.g., the EHF band.

The encapsulating material 106 can be used to assist in holding the various components of IC package 100 in fixed relative positions. The encapsulating material 106 may be formed from a suitable material configured to provide electrical insulation and physical protection for the components of IC package 100. Additionally, the encapsulating material 106 can be selected from a material that does not impede, or that optimizes passage of, signals to or from the transducer 104. For example, the encapsulating material 106 can be composed of glass, plastic, or ceramic. The encapsulating material 106 may also be formed in any suitable shape. For example, the encapsulating material 106 may be in the form of a rectangular block, encapsulating all components of the IC package 100 except for any unconnected ends of conductors connecting the die 102 to external circuits.

Figure 2:
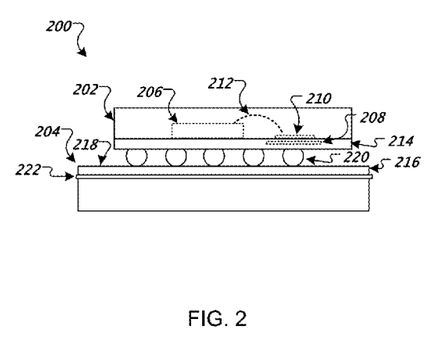
FIG. 2 shows a side view representation of an example communication device including an IC package.

FIG. 2 shows a side view representation of an example communication device 200 including an IC package 202 mounted to a PCB 204. The IC package 202 includes a die 206, a ground plane 208, a transducer 210, and one or more bond wires 212 connecting the die 206 to the transducer 210. The die 206 and transducer 210 are mounted on a package substrate 214 and encapsulated in an encapsulating material. The ground plane 208 is within the package substrate 214 and is a suitable structure configured to provide an electrical ground for the transducer 210. The ground plane 208 can extend the entire length of the package substrate 214 or just a portion, in particular, a portion underneath the transducer 210. The PCB 204 includes a top dielectric layer 216 having a surface 218. The IC package 202 is mounted to the surface 218 with mounting bumps 220 attached to a metallization pattern (not shown).

The PCB 204 also optionally includes a layer 222 spaced from dielectric layer 216 made of conductive material forming a ground plane within the PCB 204. The PCB ground plane may be any suitable structure configured to provide an electrical ground to circuits and components on the PCB 204.

Figure 3:
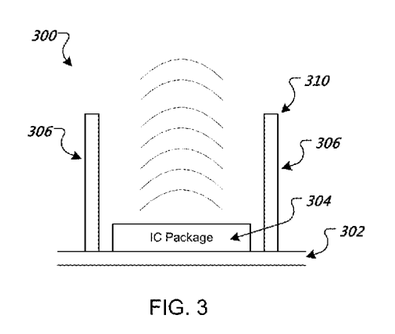
FIG. 3 is a side view of an example communication module.

FIG. 3 is a side view of an example communication module 300 including a signal guiding structure. As shown in FIG. 3, the communication module 300 includes a PCB 302, an IC package 304, and a signal guiding structure 306 providing a signal pathway. The communication module 300, can include a transmitter or receiver for transmitting or receiving signals, e.g., radio frequency signals.

In particular, the IC package 304 can correspond to the IC packages described above with respect to FIGS. 1 and 2. The IC package 304 is mounted on the PCB 302. For example, the IC package 304 can be mounted to the PCB as described with respect to FIG. 2.

The communication module 300 can be configured to transmit or receive data using radio frequency communication. For example, if the communication module 300 includes a transmitter, the communication module 300 can transmit data, which can then be received by a receiver, e.g., of another communication module.

The signal guiding structure 306 is configured to aid in directing radio frequency (RF) signals as well as to reduce interference from spurious signals. The signal guiding structure 306 can surround a perimeter of the IC package and extend in the direction of signal transmission and/or reception by a specified amount to provide a channel for emitted or received RF signals. For example, the signal guiding structure 306 can have a height 310 suitable for a particular device including the communication module 300 and that allows the signal guiding structure 306 to be positioned in proximity to a corresponding signal guiding structure of another communication module when used to communicate with another device. The height of the signal guiding structure 306 relative to the PCB 302 can be configured such that when the communication module 300 is positioned the signal guiding structure 306 is proximal to an external device housing. The signal guiding structure can be composed of a suitable material that is configured to reduce extraneous signals without disrupting passage of communications along the channel formed by the signal guiding structure 306.

FIG. 3 illustrates one IC package 304 mounted to the PCB 302. However, in other implementations, more than one IC package can be mounted to the same PCB 302. For example, a linear array of two or more IC packages, each having a corresponding signal guiding structure, are mounted to a single PCB.

The communication module 300 can be part of a communication system of a device, e.g., a computer, mobile phone, tablet, kiosk, or other device/system. The communication system can be configured to provide contactless communication using one or more IC packages. For example, the communication system can include two IC packages, one configured as a transmitter and the other configured as a receiver. The communication system can be in communication with a storage device. Thus, for example, the communication system can transfer data between the data storage unit and an external device using contactless communication provided by the IC packages.

The communication module 300 can establish communication with one or more other communication modules when placed in close proximity. For example, two devices can be positioned in proximity to each other such that the respective communication modules for transmitting and receiving data are aligned and in range of each other. In particular, for EHF frequencies, the transmitter and receiver of the two devices may need to be within specified distances. The distances can vary, for example, depending on the particular frequencies used, the materials between the transmitter and receiver, and the strength of the transmission.

In particular, the devices may be configured such that the communication module 300 of a first device can establish communication with more than one transceiver associated with a second device or one or more other transceivers that are part of the first device. For example, the communication module 300 may be able to establish communication with any transceiver within a shared EM field, e.g., an EHF field, that encompasses the transceivers, as described in detail below.

Redundant Contactless Communication

Figure 4:
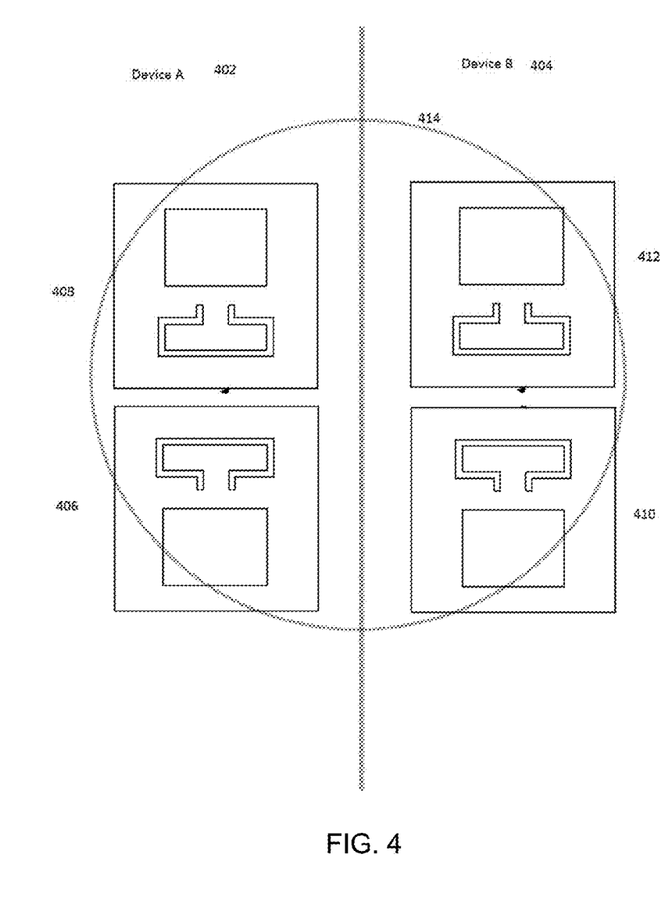
FIG. 4 is a block diagram illustrating an example of a shared communication field between contactless connectors.

FIG. 4 is a block diagram 400 illustrating an example of a shared communication field between contactless connectors. In particular, FIG. 4 illustrates a representation of a shared EM field for providing redundant contactless communication between a first device 402 and a second device 404. The first device 402 includes a first transceiver 406 and a second transceiver 408. The second device 404 includes a third transceiver 410 and a fourth transceiver 412. The first transceiver 406 and the second transceiver 408 are oriented in a way that both can communicate, e.g., transmit and receive data, from the third transceiver 410 or the fourth transceiver 412. Additionally, the first transceiver 406 can communicate with the second transceiver 408 and the third transceiver 410 can communicate with the fourth transceiver 412.

An EM shared field is conceptually illustrated by dotted circle 414, which encompasses respective antenna locations represented by the black dots. The shared field represents a region of overlapping EHF antennas from each of the transceivers such that communication can be established between any of the transceivers. Consequently, the first transceiver 406 and the second transceiver 408 are in a redundant data path configuration in the first device 402 such that if either fails, the other one can resume the connection. The third transceiver 410 and the fourth transceiver 412 are in a similar redundant path configuration. As long as one of the first and second transceivers 406, 408 can connect to one of the third and fourth transceivers 410, 412, the contactless connection link can remain active.

Figure 5:
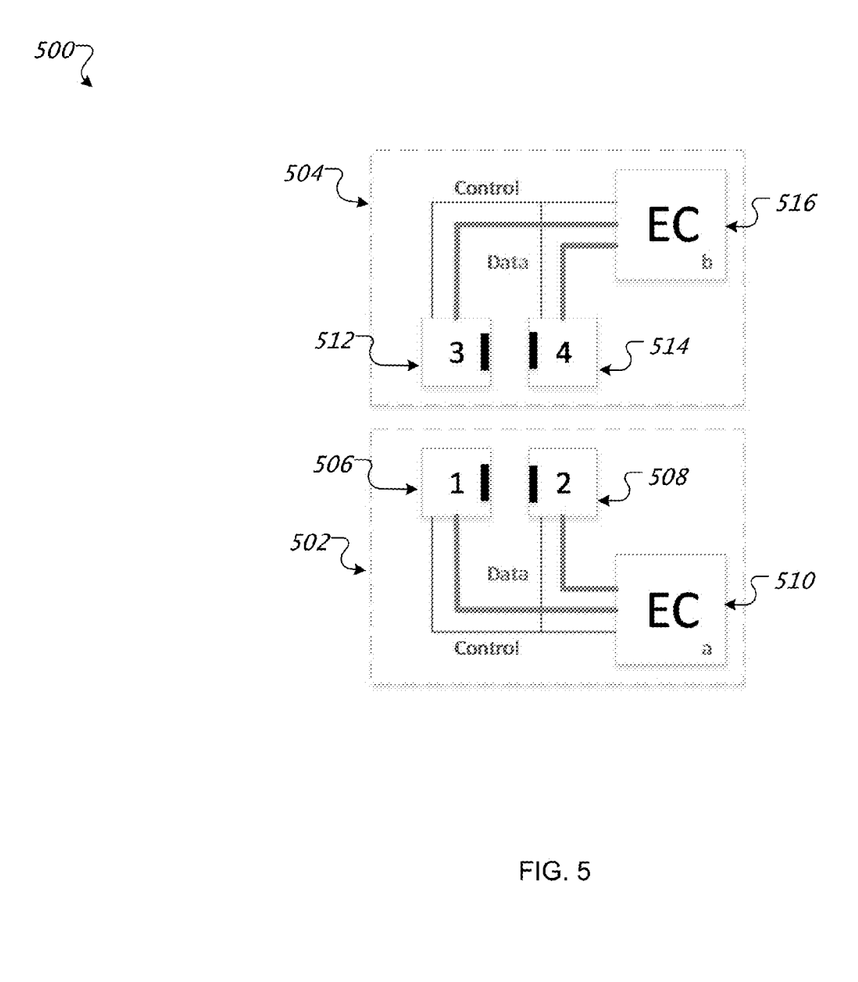
FIG. 5 is a block diagram illustrating an example of half-duplex redundant connectors.

FIG. 5 is a block diagram 500 illustrating an example of half-duplex redundant connectors. In particular, FIG. 5 shows an arrangement between a first device 502 and a second device 504 that provides redundant half-duplex communication. Half duplex communication uses a single transceiver of each device to both transmit and receive data. Thus, half duplex communication requires the respective transceivers of each device to switch between transmitting and receiving modes.

The first device 502 includes a first contactless connector 506 and a second contactless connector 508, each having a transceiver. Each contactless connector 506, 508 is coupled to a first controller 510 by respective control and data lines. Other implementations can include additional contactless connectors that provided further redundancy.

The second device 504 includes a third contactless connector 512 and a fourth contactless connector 514, each having a transceiver. Each contactless connector 512, 514 is coupled to a second controller 516 by respective control and data lines. Other implementations can include additional contactless connectors that provided further redundancy.

When the first device 502 and the second device 504 are positioned such that the respective contactless connectors are aligned, e.g., first contactless connector 506 is aligned with the third contactless communicator 512, each contactless connector can connect to the other three contactless connectors. Thus, the first contactless connector 506 can connect to the second contactless connector 508 of the first device 502, e.g., for testing purposes, as well as the third contactless connector 512 and fourth contactless connector 514 of the second device 504.

In some implementations, an initial pairing of connectors is preset. For example, the first contactless connector 506 and the third contactless connector 512 may be set to pair while the other contactless connectors are powered down. However, when needed, the first contactless connector 506 can also pair with the fourth contactless connector 514. Thus, the fourth contactless connector 514 is an example of a redundant connector that can be activated when needed, for example, in response to an error or failure of the third contactless connector 512.

Each controller can manage data flow to and from respective contactless connectors. Additionally, each controller can perform a loopback test using the overlapping EM field at startup or in response to particular link errors being detected. For example, each controller can include a state machine for performing the loopback testing. The loopback test can be performed to determine a quality of the redundant links in order to determine a connection path between the first device 502 and the second device 504. The loopback testing can be performed locally or remotely.

Figure 6:
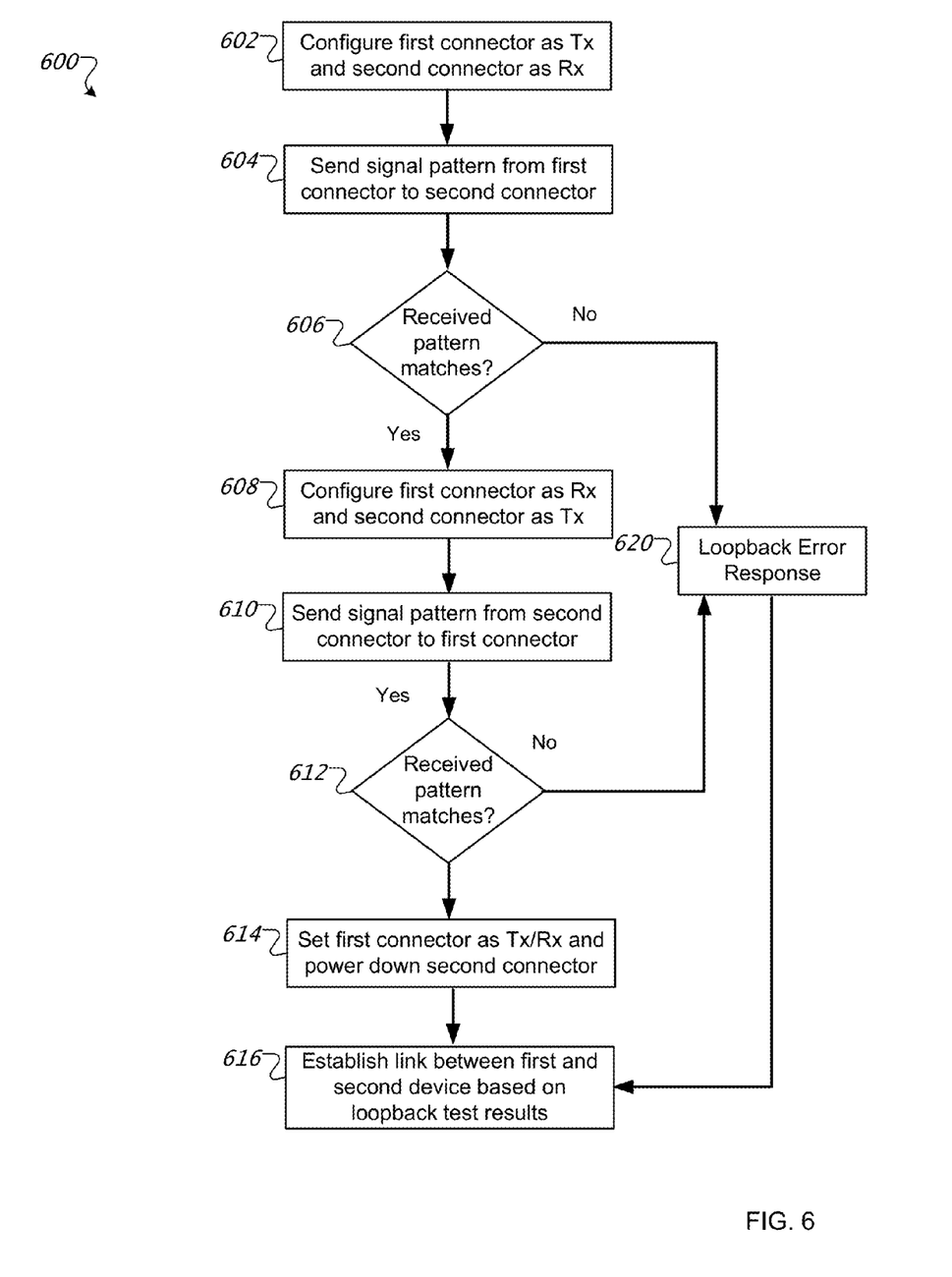
FIG. 6 is a flow diagram illustrating an example process for performing a loopback test and link setup for a half-duplex configuration.

FIG. 6 is a flow diagram 600 illustrating a loopback test and link setup for a half-duplex configuration. FIG. 6 will be described with respect to the first device 502 and second device 504 of FIG. 5. A controller, e.g., first controller 510, of the first device, e.g., first device 502 configures a first connector, e.g., first contactless connector 506, as a transmitter and a second connector, e.g., second contactless connector 508, as a receiver (602).

The controller provides a particular unique signal pattern to the first connector for transmission to the second connector (604). The controller determines whether the signal pattern received by the second connector matches the signal pattern transmitted by the first connector (606). In some implementations, the signal pattern includes field information on an identifier of the integrated circuit packages of the connector, for example, indicating which integrated circuit package is a transmitter or a receiver and the RF parameters of both connectors. The receiver receives a packet containing the information and performs a checksum or parity test that confirms that the connection is valid.

In response to a determination that the signal pattern does not match, no branch, a loopback error occurs and a loopback error response is determined (620). The loopback error response can include modifying an attempted communication link establishment as will be described in greater detail below.

In response to a determination that the signal pattern matches, yes branch, the controller configures the first connector as a receiver and the second connector as a transmitter (608). The controller provides a unique signal pattern to the second connector for transmission to the first connector (610). The controller determines whether the signal pattern received by the first connector matches the signal pattern transmitted by the second connector (612).

In response to a determination that the signal pattern does not match, no branch, a loopback error occurs and a loopback error response is determined (620). The loopback error response can include modifying an attempted communication link establishment as will be described in greater detail below.

In response to a determination that the signal pattern matches, yes branch, the controller sets the first connector as the primary connector that acts alternatively as a transmitter or receiver when communicating with the second device (614). The controller powers down the second connector, which can be activated if needed, e.g., in response to a failure of the first connector.

The loopback test, e.g., steps 602 to 614, is similarly carried out by the second device for a third and fourth connector. The second device can perform the loopback test in parallel with the first device, sequentially with the first device, or partially in parallel with the first device. In some implementations, the second device can set the third connector as the primary connector that acts alternatively as a transmitter or receiver when communicating with the first device. The fourth connector can be set a backup connection for use in case the third connector has an error or failure.

Once the loopback test is complete, the controller of the first device establishes a communication link between the first and second devices based on the loopback test results (616). If the loopback test is completed without error, the controller of the first device configures the first connector as a transmitter for a specified time period T1. Following time period T1, the controller switches the first connector to a receiver to listen for a confirmation response from the second device. Similarly, if the loopback test is completed for the second device without error, the controller of the second device configures the third connector as a receiver. In response to receiving a transmission from the first device, the controller switches the third connector to a transmitter and transmits a confirmation message. The third connector can transmit data or switch back to a receiver for a specified time T2 to listen for a transmission from the first connector. Any suitable half-duplex protocol can be used to govern communication between the particular pair of contactless connectors. For example, the half-duplex protocol can govern signals to indicate when the particular transceivers should switch between transmitter and receiver modes as well as determining when data has been correctly received or needs to be resent, e.g., using acknowledgment packets.

In response to a loopback error in the first device, instead of establishing the first connector as the primary transmitter and receiver, the controller alternates the transmitter between the first and second connectors for a fixed time, e.g., ½ T1, and then switches to a receiver to listen for a confirmation from the second device. The first or second connector can then be selected as the primary connector based on the confirmation reception. During transmission by each transmitter, the payload packet can have identifiers such as an identifier field of the particular transmitter.

Similarly, in response to a loopback error in the second device, instead of establishing the third connector as the primary transmitter and receiver, both the third and fourth connectors can initially be set as receivers. Based on whether a confirmation message is received, the third or fourth connector can then be established as the primary connector of the second device while powering down the other.

After setting up the communication link between the first and second devices, both controllers can have selected respective primary connections and powered down one or more redundant connections. Communications can then proceed between the first and second devices according to the specified half-duplex protocol. Additionally, while the communication link is established, the loopback testing status can be queried by a respective device over the communication link.

After the communication link has been established, an error condition or failure can occur in one of the respective primary connections. In some implementations, an error can be identified based on analysis of received packets. For example, a particular payload packet can include corrupt information, which can be validated by the controller with respect to a known good payload packet. In response to determining an error, the controller can generate an error flag.

In response to detecting the error condition or failure, a powered down redundant connection can be activated. This redundant connection can seamlessly take the place of the primary connection without establishing a new communication link since the redundant connection is within the shared EM field and is coupled to the same data controller as the primary connection.

Figure 7:
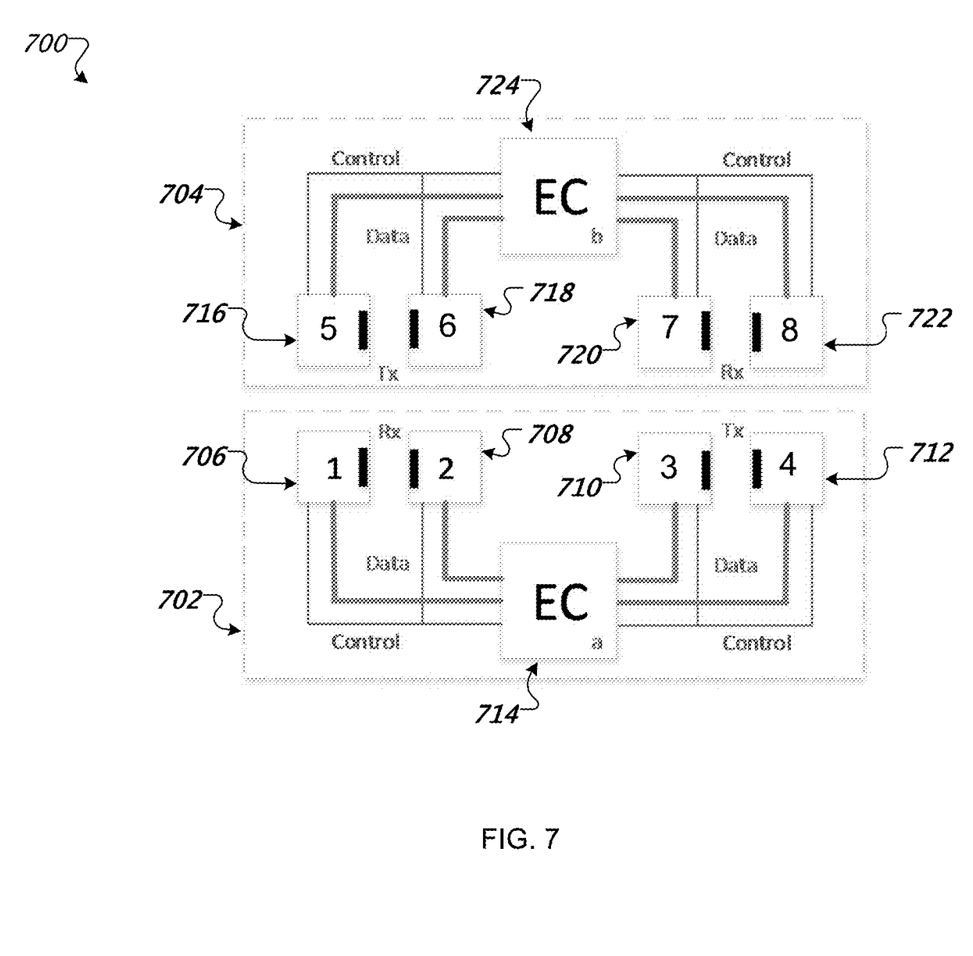
FIG. 7 is a block diagram illustrating an example of full-duplex redundant connectors.

FIG. 7 is a block diagram 700 illustrating an example of full-duplex redundant connectors. In particular, FIG. 5 shows an arrangement between a first device 702 and a second device 704 that provides redundant full duplex communication. Full duplex communication uses a dedicated transmitter and receiver in each device for communication without having to switch a transceiver back and forth between a transmitter and receiver. Thus, two or more communication links are established between the two devices. Full duplex communication can provide high speed data communication between devices.

The first device 702 includes a pair of transmitter connectors and a pair of receiver connectors. In particular, a first contactless connector 706 and a second contactless connector 708 operate as receivers. A third contactless connector 710 and a fourth contactless connector 712 operate as transmitters. Each contactless connector 706, 708, 710, and 712 is coupled to a first controller 714 by respective control and data lines.

The second device 704 includes a pair of transmitter connectors and a pair of receiver connectors. In particular, a fifth contactless connector 716 and a sixth contactless connector 718 operate as receivers. A seventh contactless connector 720 and an eighth contactless connector 722 operate as transmitters. Each contactless connector 716, 718, 720, and 722 is coupled to a first controller 724 by respective control and data lines.

When the first device 702 and the second device 704 are positioned such that the respective contactless connectors are aligned, pairs of redundant connectors can connect. In particular, each of the first contactless connector 706 and the second contactless connector 708 can connect to either of the fifth contactless connector 716 and the sixth contactless connector 718. Similarly, each of the third contactless connector 710 and the fourth contactless connector 712 can connect to either of the seventh contactless connector 720 and the eighth contactless connector 722. Furthermore, the contactless connectors of each pair can connect to each other. For example, the first contactless connector 706 can connect to the second contactless connector 708.

In some implementations, an initial pairing of connectors between the first and second devices 702 and 704 is preset. For example, the first contactless connector 706 and the fifth contactless connector 716 can be set as a transmitter receiver pair as well as the third contactless connector 710 and the seventh contactless connector 720. However, when needed, the redundant contactless connectors can be activated to provide the pairing. For example, a failure of the third contactless connector 710 operating as a transmitter can cause the fourth contactless connector 712 to activate and take over the connection with the seventh contactless connector 720 operating as a receiver for the second device.

Each controller can manage data flow to and from respective contactless connectors. Additionally, each controller can perform a loopback test using the overlapping EM field at startup or in response to particular link errors being detected. For example, each controller can include a state machine for performing the loopback testing. The loopback test can be performed to determine a quality of the redundant links in order to determine a connection path between the first device 702 and the second device 704. The loopback testing can be performed locally or remotely.

Figure 8:
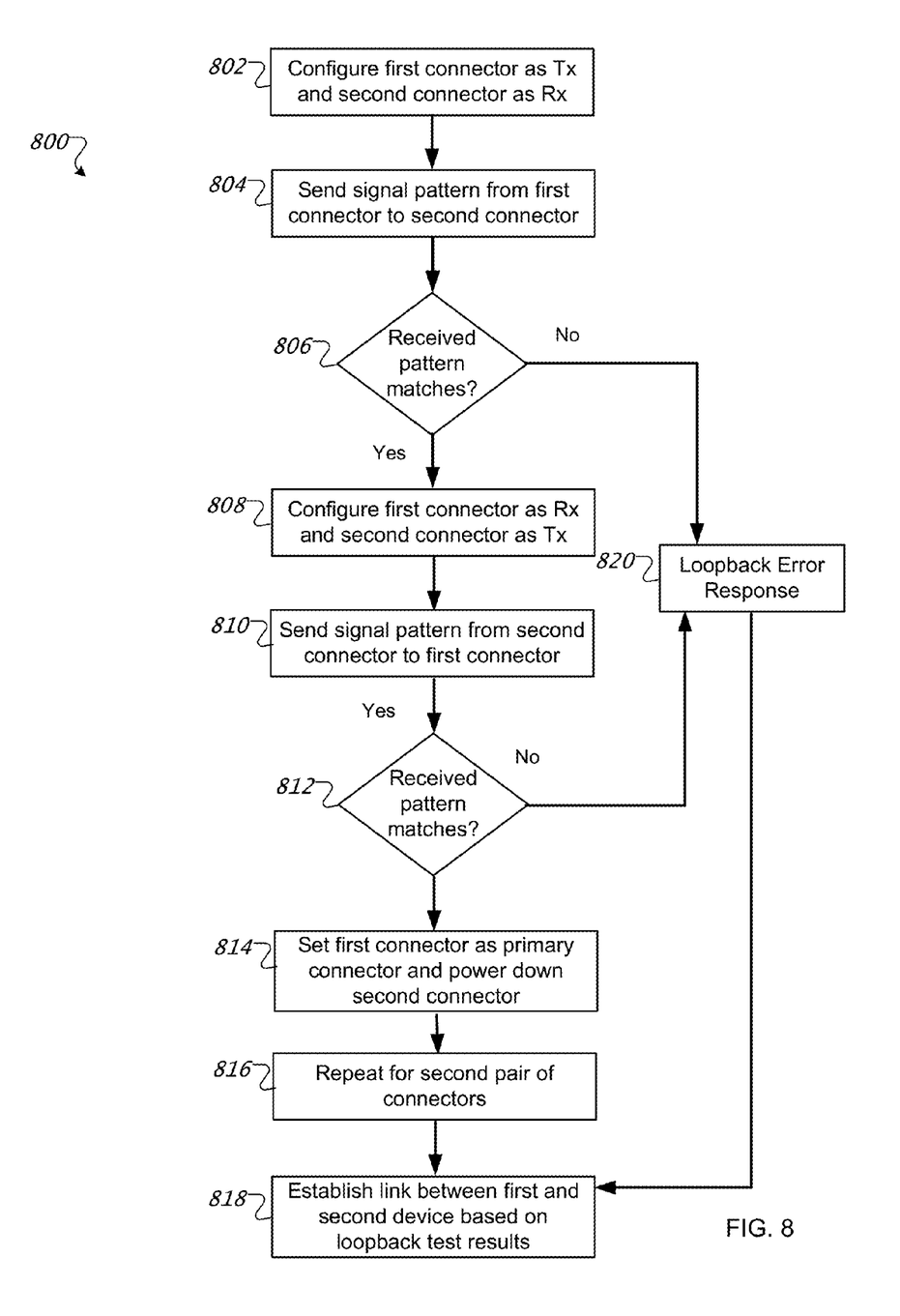
FIG. 8 is a flow diagram illustrating an example process for performing a loopback test and link setup for a full duplex configuration.

FIG. 8 is a flow diagram 800 illustrating a loopback test and link setup for a full duplex configuration. FIG. 8 will be described with respect to the first device 702 and second device 704 of FIG. 7.

A controller, e.g., first controller 714, of the first device, e.g., first device 702 configures a first connector, e.g., first contactless connector 706, as a transmitter and a second connector, e.g., second contactless connector 708, as a receiver (802). In particular, the first connector and the second connector form a first pair of connectors of the first device. In operation, one connecter of the pair is active as the primary connector of the first pair and the second connecter of the first pair is a redundant powered down connector. The controller provides a particular unique signal pattern to the first connector for transmission to the second connector (804). The controller determines whether the signal pattern received by the second connector matches the signal pattern transmitted by the first connector (806).

In response to a determination that the signal pattern does not match, no branch, a loopback error occurs and a loopback error response is determined (820). The loopback error response can include modifying a communication link establishment process as will be described in greater detail below.

In response to a determination that the signal pattern matches, yes branch, the controller configures the first connector as a receiver and the second connector as a transmitter (808). The controller provides a unique signal pattern to the second connector for transmission to the first connector (810). The controller determines whether the signal pattern received by the first connector matches the signal pattern transmitted by the second connector (812).

In response to a determination that the signal pattern does not match, no branch, a loopback error occurs and a loopback error response is determined (820). The loopback error response can include modifying a communication link establishment process as will be described in greater detail below.

In response to a determination that the signal pattern matches, yes branch, the controller sets the first connector as the primary connector for the first pair (814). In some implementations, the first connector is designated as a receiver for the first device. The controller powers down the second connector, which can be activated as the receiver for the first device if needed, e.g., in response to a failure of the first connector.

The loopback test, e.g., steps 802 to 814, is similarly carried out for a second pair of connectors of the first device (816). The controller can perform the loopback test for the second pair of connectors in parallel with the first pair of connectors, sequentially with the first pair, or partially in parallel with the first pair.

In particular, the third connector and a fourth connector form the second pair of connectors of the first device. In operation, one connecter of the second pair is active as the primary connector of the second pair and the second connecter of the second pair is a redundant powered down connector. In response to a successful loopback test, the controller sets the third connector as the primary connector of the second pair. In some implementations, the third connector is designated as a transmitter for the first device. The controller powers down the fourth connector, which can be activated as the transmitter for the first device if needed, e.g., in response to a failure of the third connector.

Once the loopback test is complete, the controller of the first device establishes a link between the first and second devices based on the loopback test results (818). With reference to FIG. 7, if the loopback test is completed without error, the controller of the first device configures the first connector 706 as a receiver for the first device and the third connector 710 as the transmitter for the first device. The controller of the second device, in response to corresponding error free loopback tests, configures the fifth connector 716 as the transmitter for the second device and the seventh connector 720 as the receiver for the second device. Any suitable full duplex protocol can be used to govern communication between the particular pair of contactless connectors.

In response to a loopback error in the first device for the first pair of connectors, both are activated as receivers and the first connector or the second connector is set as the primary receiver based on data reception.

In response to a loopback error in the first device for the second pair of connectors, transmissions of control packets are alternated between the third connector and the fourth connector of the second pair. Either the third or the fourth connector can be selected based on data reception of the control packet. Each connector transmits a unique control packet that is identified in the return message so that the controller can determine which transmitter of the third connector and fourth connector is operating. The second device can perform similar operations to establish a communication link in response to a loopback error.

After setting up the communication link between the first and second devices, both controllers will have selected the primary transmitter and receiver connectors and powered down the redundant connection. Communications can then proceed between the first and second devices according to the specified full duplex protocol. Additionally, while the communication link is established, the loopback testing status can be queried by a respective device over the communication link.

Figure 9:
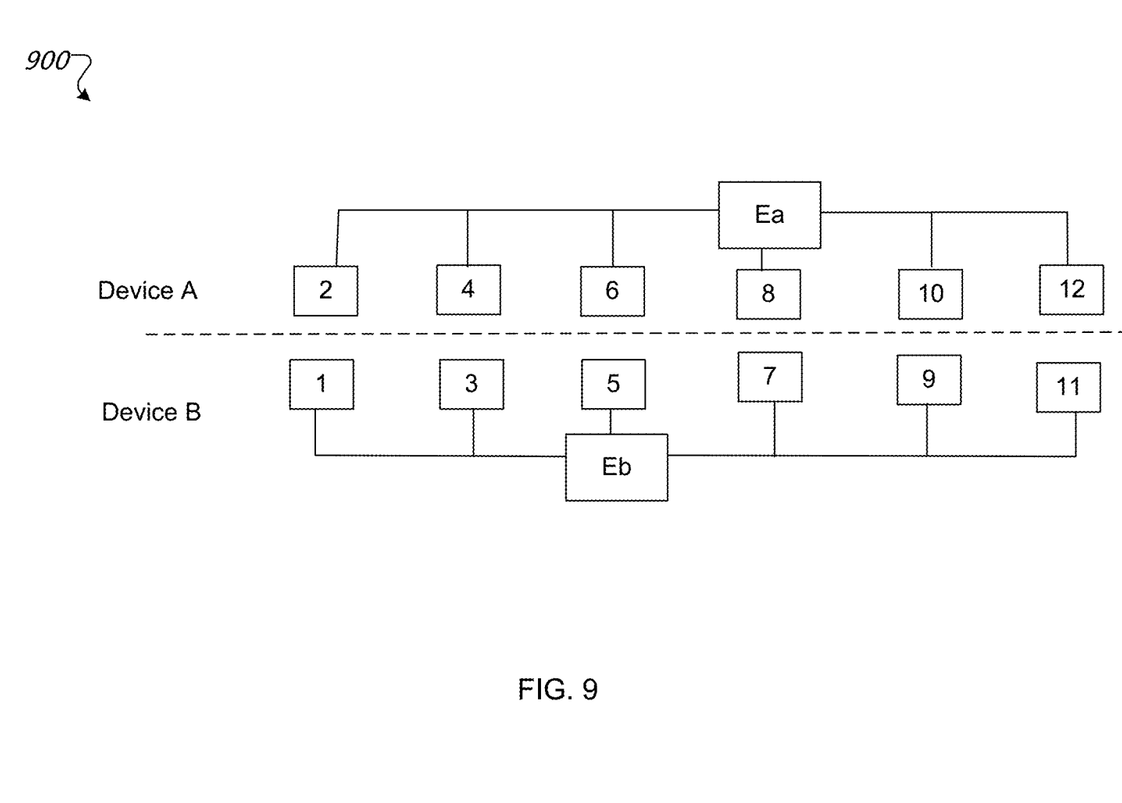
FIG. 9 is a block diagram illustrating an example of redundant connectors with more than two connectors.

FIG. 9 is a block diagram 900 illustrating an example of redundant connectors with more than two connectors. Such a system could exist, for example, for systems transporting video data. Diagram 900 shows Device A and Device B. Each device has six potential connectors.

In one example, successive loopback tests can be performed to determine connectors. In particular, three connectors can be examined at a time. Take Device A connectors 2, 4, and 6 and Device B connectors 1, 3, and 5. A respective device controller can perform a loopback test between Device A connectors 2 and 4 and Device B connectors 1 and 3. If the loopback test is completed successfully, lane 2-1 becomes a communication lane. Connectors 4 and 3 perform a similar loopback test on connectors 6 and 5. If the loopback test is successful, lane 6-5 can become a communication lane. Connectors 4 and 3 become the drop in replacement connectors if the loopback fails.

If the number of connectors increases then a mechanism needs to be in place if more than two connectors would fail the loopback to keep the system link active between the devices. By having symmetry and control for every three successive connectors, primary and secondary rings can be formed.

A number of embodiments of the invention have been described. Nevertheless, it will be understood that various modifications may be made without departing from the spirit and scope of the invention. Accordingly, other embodiments are within the scope of the following claims.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
    performing a loopback test on a first contactless connector and a second contactless connector of a first device, wherein performing the loopback test comprises:
        configuring the first contactless connector as a transmitter and the second contactless connector as a receiver,
        sending a first signal pattern from the first contactless connector to the second contactless connector,
        determining whether a first received signal pattern received by the second contactless connector matches the first signal pattern,
        in response to determining that the first received signal pattern matches the first signal pattern, configuring the first contactless connector as a receiver and the second contactless connector as a transmitter,
        sending a second signal pattern from the second contactless connector to the first contactless connector,
        determining whether a second received signal pattern received by the first contactless connector matches the second signal pattern,
        in response to determining that the second received signal pattern matches the second signal pattern, configuring the first contactless connector as a primary connector and the second contactless connector as a redundant connector; and
    establishing a communication link between the first device and a second device using the primary connector.

2. The method of claim 1, wherein establishing the communication link between the first device and the second device includes configuring half-duplex communication.

3. The method of claim 2, wherein the half duplex communication includes switching the transceiver of the primary connector between transmitter and receiver modes.

4. The method of claim 1, wherein in response to determining that the first or second received signal pattern does not match, respectively, the first or second signal pattern, determining a loopback error response.

5. The method of claim 4, wherein the loopback error response establishes a primary connector for communication with the second device by alternating transmission by the first contactless connector and the second contactless connector and establishing the primary connector based on confirmation messages received from the second device.

6. The method of claim 1, further comprising:
    determining an error condition in the first contactless connector; and
    responsive to the error, activating the second contactless connector and using the second contactless connector to provide the communication link between the first device and the second device.

7. A system comprising:
    a first device comprising:
        a first contactless connector and a second contactless connector, and
        a first controller configured to test the first contactless connector and the second contactless connector to determine a primary connector and a redundant connector, wherein the primary connector is configured to establish a communication link with a connector of another device;
wherein the testing comprises:
configuring the first contactless connector as a transmitter and the second contactless connector as a receiver,
sending a first signal pattern from the first contactless connector to the second contactless connector,
determining whether a first received signal pattern received by the second contactless connector matches the first signal pattern,
in response to determining that the first received signal pattern matches the first signal pattern, configuring the first contactless connector as a receiver and the second contactless connector as a transmitter,
sending a second signal pattern from the second contactless connector to the first contactless connector,
determining whether a second received signal pattern received by the first contactless connector matches the second signal pattern, and
in response to determining that the second received signal pattern matches the second signal pattern, configuring the first contactless connector as a primary connector and the second contactless connector as a redundant connector.

8. The system of claim 7, wherein the first controller includes a state machine configured to test the operation of the first contactless connector and the second contactless connector, wherein a primary connector and a redundant connector is established based on the testing.

9. The system of claim 7, wherein the first and second contactless connectors of the first device each include a transceiver having an antenna oriented such that the first and second contactless connector are communicatively coupled to each other.

10. The system of claim 7, further comprising:
a second device comprising:
a third contactless connector and a fourth contactless connector, and
a second controller configured to test the third contactless connector and the fourth contactless connector to determine a primary connector and a redundant connector,
wherein each of the first contactless connector and the second contactless connector is configured to selectably establish a communication link with either the third contactless connector or the fourth contactless connector.

* * * * *